US005403430A

United States Patent [19]

Araujo et al.

[11] Patent Number: 5,403,430

[45] Date of Patent: Apr. 4, 1995

[54] BORDER ROLLER APPLICATOR

[76] Inventors: Mario Araujo; Mike Turner, both of 26 Boulding Drive, Aurora, Ontario, Canada, L4G 2V7

[21] Appl. No.: 180,992

[22] Filed: Jan. 14, 1994

Related U.S. Application Data

[63] Continuation of Ser. No. 894,906, Jun. 8, 1992, abandoned.

[51] Int. Cl.[6] .............. B32B 31/00

[52] U.S. Cl. .............. 156/523; 156/524; 156/574; 156/575; 156/579; 118/501

[58] Field of Search .............. 156/523, 524, 526, 574, 156/575, 576, 577, 578, 579, 534; 118/501, 502, 405

[56] References Cited

U.S. PATENT DOCUMENTS

| | | | |
|---|---|---|---|
| 481,251 | 8/1892 | Barton | 156/575 |
| 776,950 | 12/1904 | Simpson | 156/575 |
| 1,901,908 | 3/1933 | Hoyos | 156/577 X |
| 3,980,046 | 9/1976 | Homan | 118/405 |
| 4,279,687 | 7/1981 | Buchholz et al. | 156/568 |

*Primary Examiner*—David A. Simmons
*Assistant Examiner*—James J. Engel
*Attorney, Agent, or Firm*—Eugene J. A. Gierczak

[57] ABSTRACT

An applicator for applying wetted, pasted wallpaper border to a wall comprising: a tray having parametral sidewalls; a handle connected to the tray; a spool disposed at one end of the tray within the sidewalls for dispensing a roll of the wallpaper border; a roller disposed at another end of the tray within the sidewalls for applying the wallpaper border to the wall; and a wiper blade disposed between the spool and the roller for wiping excess paste and water from the border.

19 Claims, 10 Drawing Sheets

BORDER ROLLER APPLICATOR

This is a continuation of application Ser. No. 07/894,906, filed Jun. 8, 1992, now abandoned.

FIELD OF INVENTION

This invention relates to an applicator for applying wallpaper border to a wall and particularly relates to an applicator having a spool containing a roll of the wallpaper therearound and a rotatable roller for engaging and applying the wallpaper border to a wall with a wiper blade disposed between the border and the spool for wiping excess paste and the like.

BACKGROUND OF THE INVENTION

The broadest aspect of this invention relates to apparatus for applying wet pasted paper horizontally to a surface comprising: a tray, a rotatable spool disposed at one end of said tray at a perpendicular angle relative said tray, said spool adapted to receive a roll of said paper, a roller disposed at another end of said tray at a perpendicular angle relative said tray for applying said paper to said wall as said paper is unrolled from said spool, a blade disposed between said spool and said roller at a perpendicular angle relative said tray for wiping said paper, a guide disc concentric with said rotatable spool, said guide disc adapted to rotatably contact said wall so as to maintain proper spacing of said rolled paper from said wall when said paper is unrolled from said spool, said guide disc: extends beyond said tray, and includes apertures for permitting passage of excess wet paste from said wet pasted paper rolled about said spool into said tray.

Another aspect of this invention relates to an applicator for applying wetted, pasted wallpaper border to a wall comprising: a tray having parametral side walls, a handle connected to said tray at a perpendicular angle, a spool having an axis of rotation perpendicular to said tray and disposed at one end of said tray within said sidewalls wherein said spool is adapted to receive and dispense a roll of said wallpaper border, a roller having an axis of rotation perpendicular to said tray and disposed at another end of said tray within said sidewalls for applying said wallpaper border to said wall, a wiper blade disposed at a perpendicular angle to said tray between said spool and said roller for wiping excess paste and water from said border, a wiper blade disposed at a perpendicular angle to said tray between said spool and said roller for wiping excess paste and water from said border, a sleeve adapted to frictionally engage said spool so as to accommodate different widths of said wallpaper, said sleeve including a base to support said paper where said base extends beyond said tray and includes drain slots for permitting the passage of excess wet paste from said wetted pasted wallpaper rolled about said spool into said tray.

Yet another aspect of this invention relates to a method of applying wetted pasted wallpaper border of a certain width horizontally at the top of a wall adjacent a ceiling with apparatus having a tray, a spool having a rotatable end connected to one end of said tray and a free rotatable end, a roller disposed at another end of said tray, a blade disposed between said spool and said roller, and a sleeve adapted to slidingly frictionally engage said spool, said method comprising the steps of: sliding said sleeve along said spool to accommodate said width of said wallpaper along said spool, rolling said wetted wallpaper about said spool whereby one end of said roll of wallpaper contacts said sleeve and another end of said rolled wallpaper is adjacent said free end of said spool so as to permit application of said border horizontally at the top of said wall adjacent said ceiling, pulling said wallpaper from said roll against said blade and said roller, applying said pulled wallpaper against the top of said wall adjacent said ceiling, moving said apparatus in a direction so as to unwind said wallpaper from said spool so as to pull said wallpaper against said blade to wipe excess water and paste into said tray, and against said roller to apply said wallpaper horizontally at the top of said wall adjacent said ceiling.

Yet a further aspect of this invention relates to apparatus for applying wet pasted paper horizontally to a surface comprising: a tray, a rotatable spool having an axis of rotation, said spool disposed at one end of said tray at a perpendicular angle relative said tray, said spool adapted to receive a roll of said paper, a roller having an axis of rotation, said roller disposed at another end of said tray at a perpendicular angle relative said tray for applying said paper to said wall as said paper is unrolled from said spool, blade means disposed between said spool and said roller at a perpendicular angle relative said tray for wiping said paper, said blade, said axis of rotation of said spool and said axis of rotation of said blade are disposed along a common plane.

Yet another aspect of this invention relates to apparatus for applying wet pasted paper horizontally to a surface comprising: a tray, a rotatable spool disposed at a perpendicular angle relative said tray, said spool adapted to receive a roll of said paper, a guide disc concentric with said rotatable spool, said guide disc adapted to rotatably contact said wall so as to maintain proper spacing of said rolled paper from said wall when said paper is unrolled from said spool, said guide disc: extends beyond said tray and includes apertures for permitting passage of excess wet paste from said wet pasted paper rolled about said spool into said tray.

In the case of an un-pasted border, the paste must be applied thereto directly and then applied to the wall.

The application of the wallpaper border is typically messy as the excess water or paste may drip from the wallpaper border onto the fingers and hands of the users who thereafter may transfer such excess to the decorative surface of the wallpaper border.

It is an object of this invention to provide an applicator which is simple and efficient to use in order to apply wallpaper border to a wall and which applicator may be used by one person.

The broadest aspect of this invention relates to apparatus for applying paper to a surface comprising: a tray; a rotatable spool disposed at one end of the tray, the spool adapted to receive a roll of the paper; a roller disclosed at another end of the tray for rotatably applying the paper to the wall as the paper is unrolling from the spool; and the blade disposed between the spool and the roller for wiping the paper.

Another aspect of this invention relates to an applicator for applying wetted, pasted wallpaper border to a wall comprising: a tray having parametral sidewalls; a handle connected to the tray; a spool disposed at one end of the tray within the sidewalls, wherein the spool is adapted to receive and dispense a roll of the wallpaper border; a roller disposed at another end of said tray within these sidewalls for applying said wallpaper border to the wall; and a wiper blade disposed between said spool and the roller for wiping excess paste and water from the border.

SUMMARY OF THE INVENTION

DESCRIPTION OF DRAWINGS OF THE INVENTION

These and other objects and features shall now be described in relation to the following drawings.

DESCRIPTION OF THE INVENTION

Figure 1:
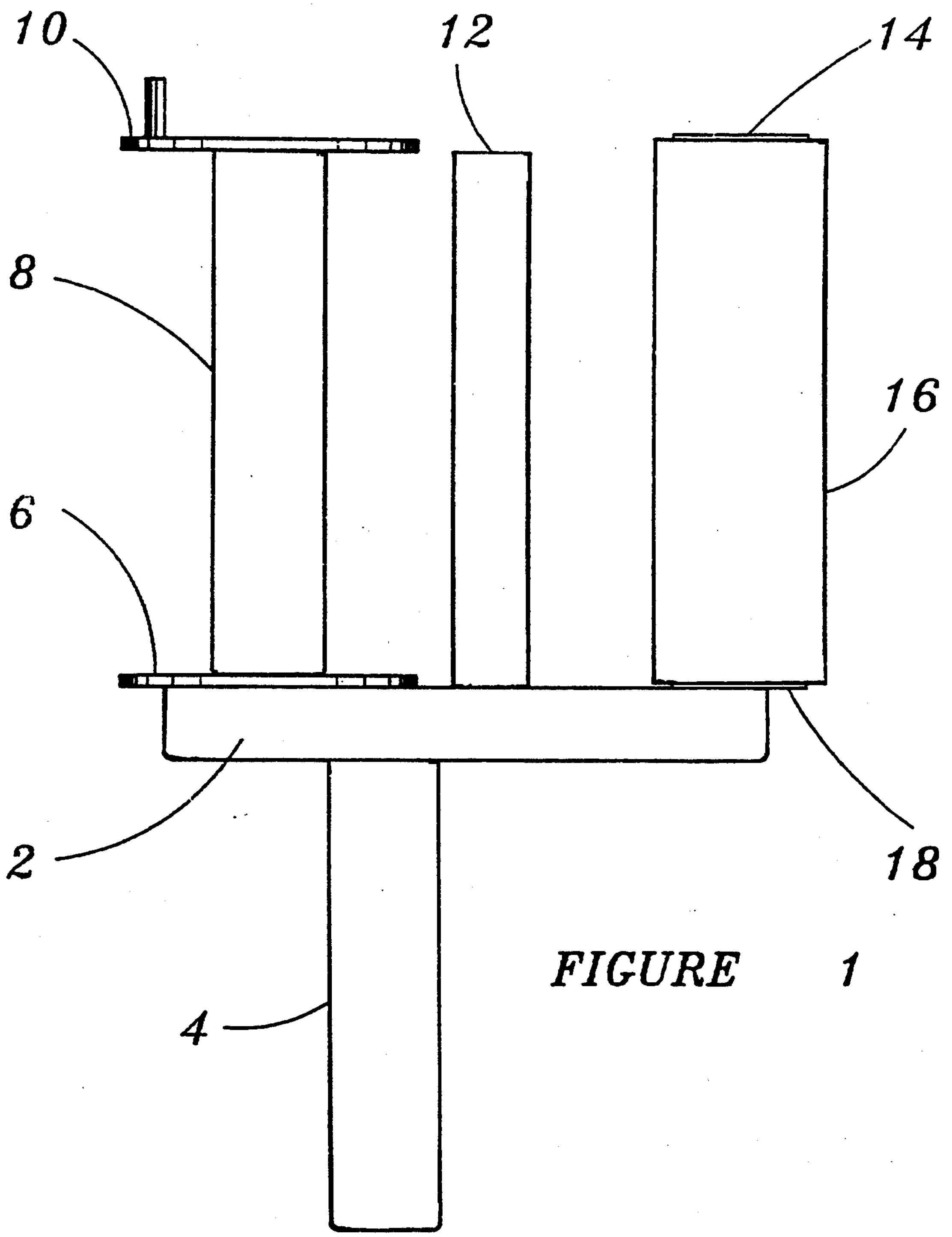
FIG. 1 is a front elevational view of the wallpaper border applicator.

FIG. 1 is a front elevational view of the applicator which includes a tray 2, and a handle 4, attached to the bottom of the tray.

The applicator also includes a guide disc 6 and a slotted spool 8, which is adapted to receive one end of a wallpaper border (not shown) which is wound around the spool 8.

The spool 8 includes a detachable spool crank 10 which is adapted for engagement and removal from the spool 8 and is used so as to rotate the spool 8 and thereby rotate the spool so as to roll a roll or wallpaper border therearound.

The applicator also includes a wiper 12 which shall be more fully described herein.

Figure 2:
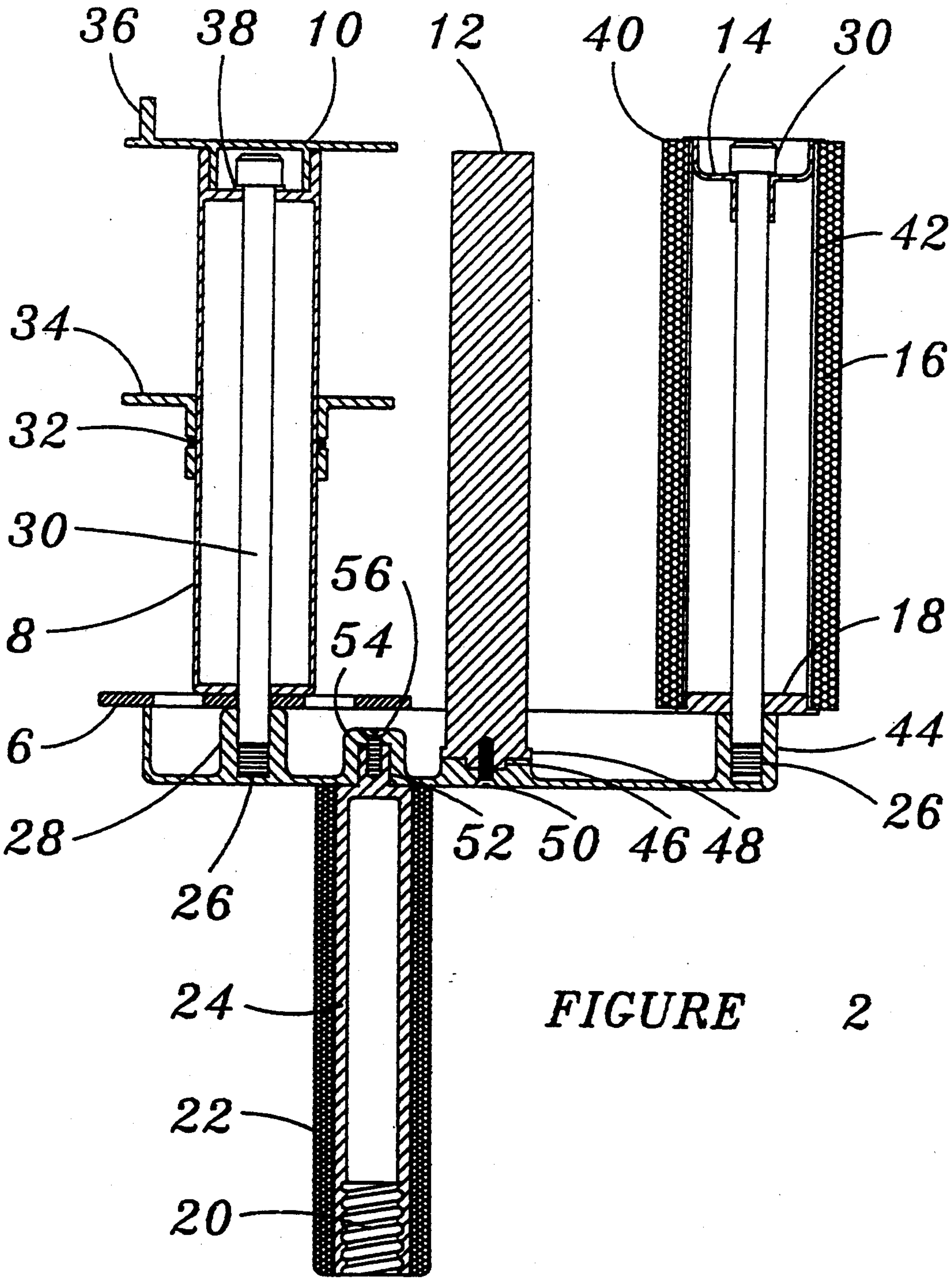
FIG. 2 is a full cross-section view of the applicator as shown in FIG. 1.

The spool 8 is disposed at one end of the tray 2, while the roller 16, is adapted at another end of the tray 2 as best seen in FIGS. 1 and 2.

In the embodiment disclosed in FIGS. 1 and 2 the spool 8 is located within the confines of the parametral upstanding tray sidewalls 98, 100 and 108.

Moreover, the roller 16 is adapted for rotational movement at the other end of the tray 2 where half of the roller 16 is disposed over the tray 2 and the other half of the roller 16 is disposed beyond the tray.

In another embodiment of the invention, the roller 16 may be disposed entirely within the confines of the sidewalls so that the tray 2 may capture all of the excess water and paste which may fall from the wallpaper as it is being applied to the wall.

The roller 16 includes a top roller applicator bushing 14 and a bottom roller applicator bushing 18.

The applicator also includes a wiper 12 which is disposed between the spool 18 and the roller 16 and is adapted to contact and wipe excess water and paste from the wallpaper as it is being unrolled from the spool and being applied by the roller 16 to a surface or wall.

FIG. 2 illustrates the applicator of FIG. 1 in full cross-section.

The spool 8 is hollow as best seen in FIG. 2 and includes two opposite ends which are adapted to receive a retaining pin or bolt 30. The retaining pin 30 includes threads 26 at one end thereof which are adapted to be received by a threaded spool boss 28 so as to rotatably secure the spool 30 to the tray 2.

The retaining pin 30 also includes a spring washer which is adapted to bear against the threaded pin and shoulder so as to urge the spool 8 against the guide disc 6.

The guide disc 6 is adapted to contact the wall and maintain the proper spacing of the rolled wallpaper border from the wall. The guide disc includes a series of apertures or drain slots 83 which are adapted to permit the passing of glue and water from the roll of wallpaper border into the tray 2.

Figure 5:
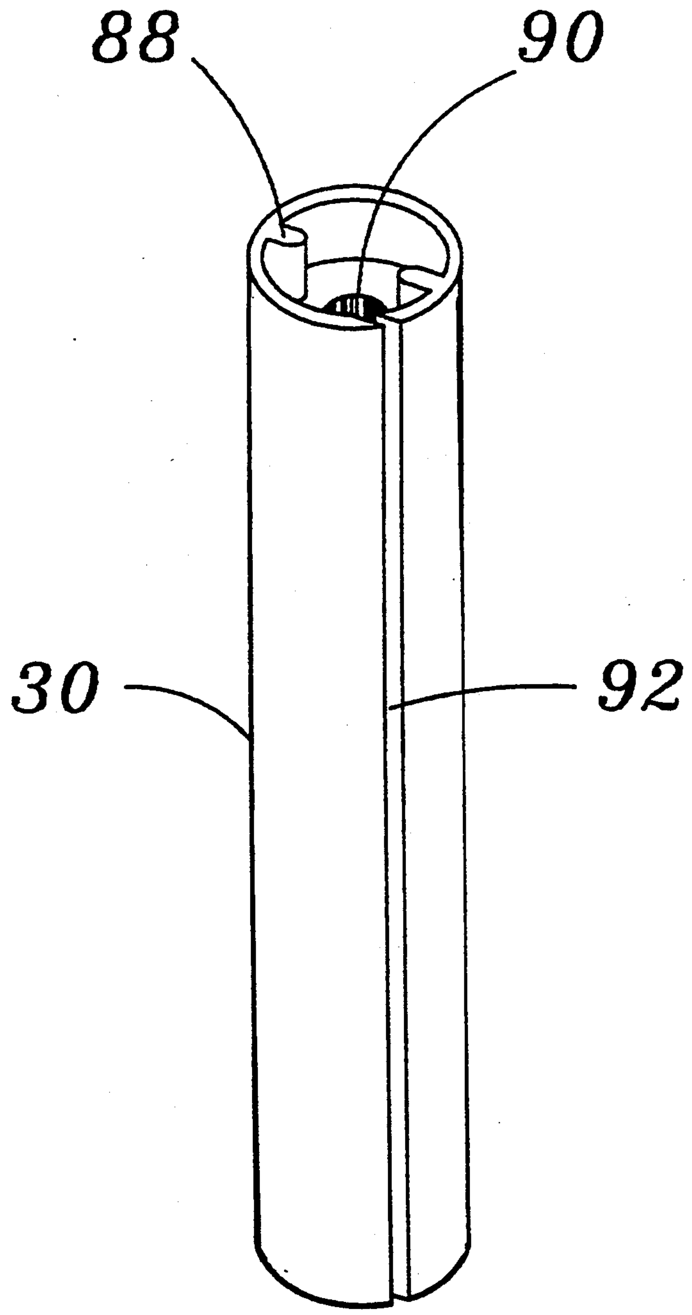
FIG. 5 is a perspective view of the spool.
Figure 6:
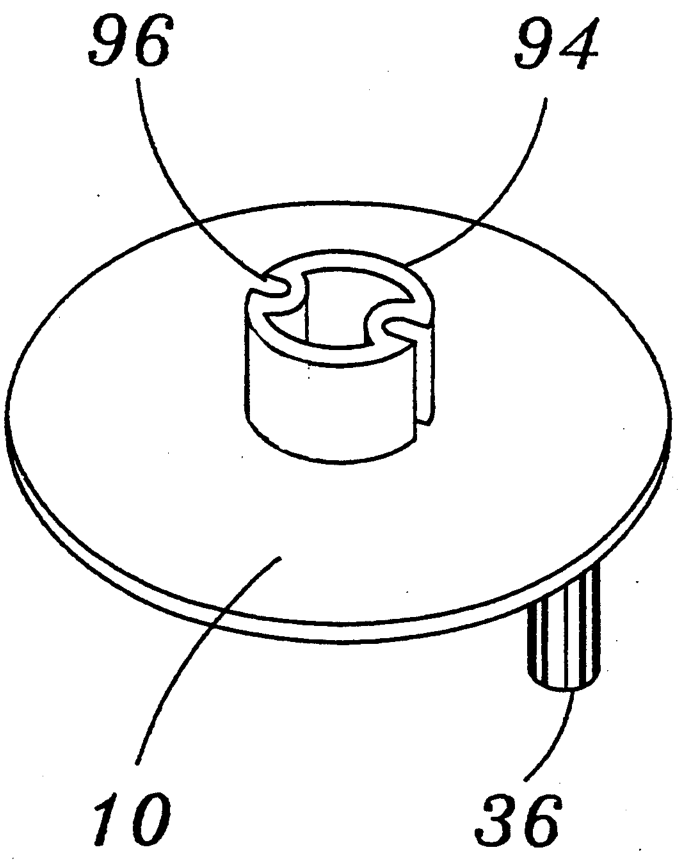
FIG. 6 is a perspective view of the spool crank.

The spool 8 is more fully particularized in FIG. 5 which shows male spool crank handle tangs 88 which are adapted to engage the female spool crank handle slots 96 as shown in FIG. 6. Furthermore, the spool 8 includes a retaining pin bearing 90 as well as angled retaining slots 92 for receiving the end of the paper.

FIG. 6 illustrates the spool crank handle mount diameter 94 which is adapted to receive at one end of the spool 8 as shown in FIG. 5. The spool crank handle 94 is used only for winding pre-.soaked paper onto the slotted spool and to be removed prior to application of the wallpaper to the wall. The spool crank handle includes handle 36 mounted to the spool crank 10

Figure 7:
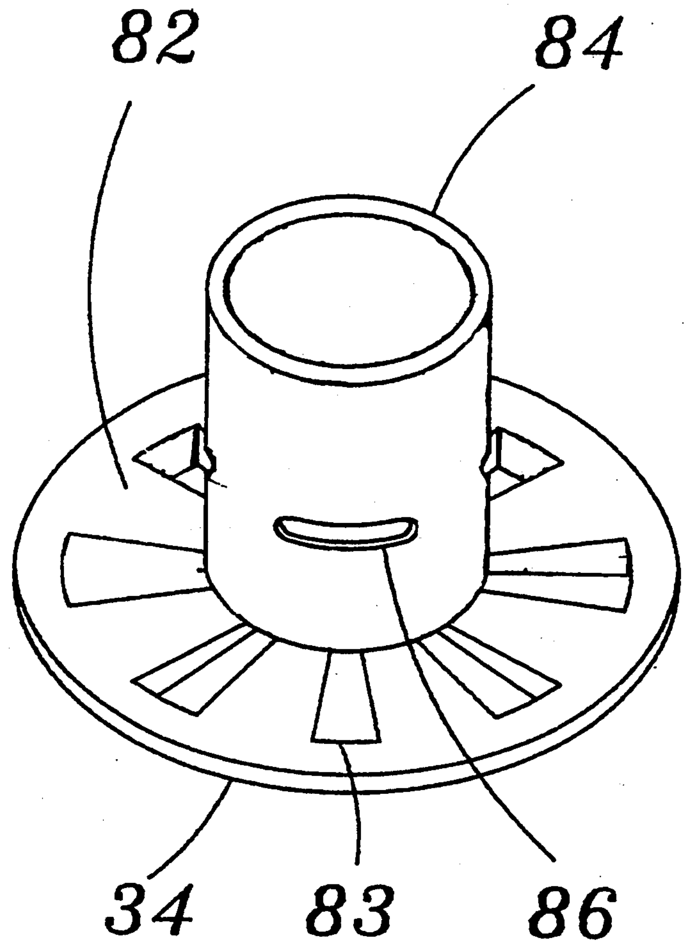
FIG. 7 is a perspective view of the sleeve.

FIG. 7 more fully particularizes the sleeve 34 which is adapted to frictionally engage the outside diameter of spool 8.

In particular the sleeve 34 includes an outside diameter 84 which is adapted to slide over the outside diameter of sleeve 8. Open slots 86 are presented by the sleeve 34 and are adapted to expose the slotted spool surface at four locations therearound.

The sleeve 34 also includes a paper-support base 82 which has a series of drain slots 83 for permitting the: passage of glue and water from the wallpaper border into the tray.

The slots are adapted to receive an 0-ring 32 so as to frictionally engage the outside diameter of spool 8.

Accordingly, the sleeve 34 may be displaced along the outside surface of spool 8 so as to accommodate different widths of wallpaper border.

Figure 4:
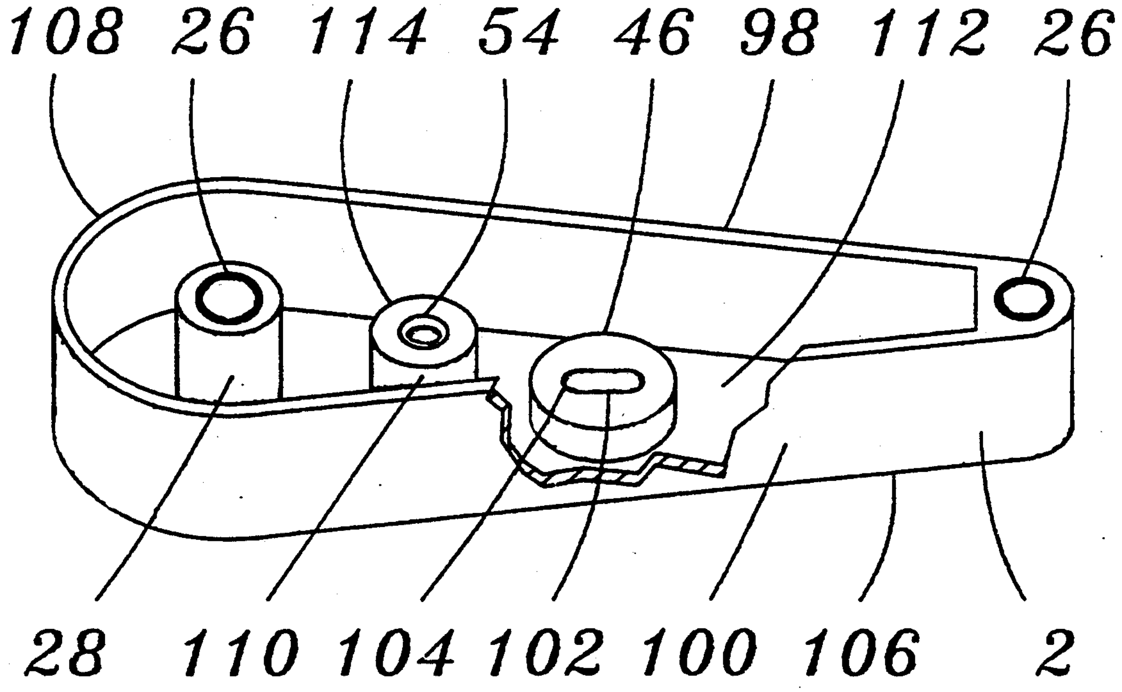
FIG. 4 is a partial broken-out view of the tray.

The tray is best shown in FIG. 4 and includes tray sidewalls 98 and 100 as well as the tray radiused wall 108.

The tray also includes, within the confines of the sidewall, a countersunk slot 102 adapted to receive a positioning tang 74 presented by the wiper blade 12. The positioning tang 74 includes a threaded hole 72 which is adapted to receive a screw 50 which may be engaged from the bottom of the tray as shown in FIG. 2. The blade 12 also includes a wiper base 70, a top surface of the wiper 64, structural support radius 66 and radiused wiper edge ,68 adapted to wipe excess water and paste from the wallpaper border.

The applicator also includes a handle 24 having a handle grip 22.

The tray 2 includes a keyed base handle boss 54 which is adapted to receive a keyed handle mount 52 having a threaded hole adapted to receive a handle fastener 56 as best illustrated in FIG. 2.

The handle 24 is hollow and includes a threaded portion 20 adapted to threadedly receive the end of a threaded grooved handle or the like so as to extend the reach of the applicator.

FIG. 2 also discloses the keyed base wiper boss 46, keyed wiper mount 48 and wiper fastener 50.

The roller 16 includes a hollow cylinder or sleeve 42 which is adapted to receive a foam sleeve 40. The roller 16 also includes the top roller applicator bushing 14 and bottom roller applicator bushing 18 with retaining pin 30 similar to the one which is adapted to be received by the spool 8. The tray 2 includes an applicator roller boss 44 which is adapted to receive the threaded end 26 of the pin 30 as best illustrated in FIG. 2. The roller 16 is adapted for rotational movement around the pin 30.

Figure 3:
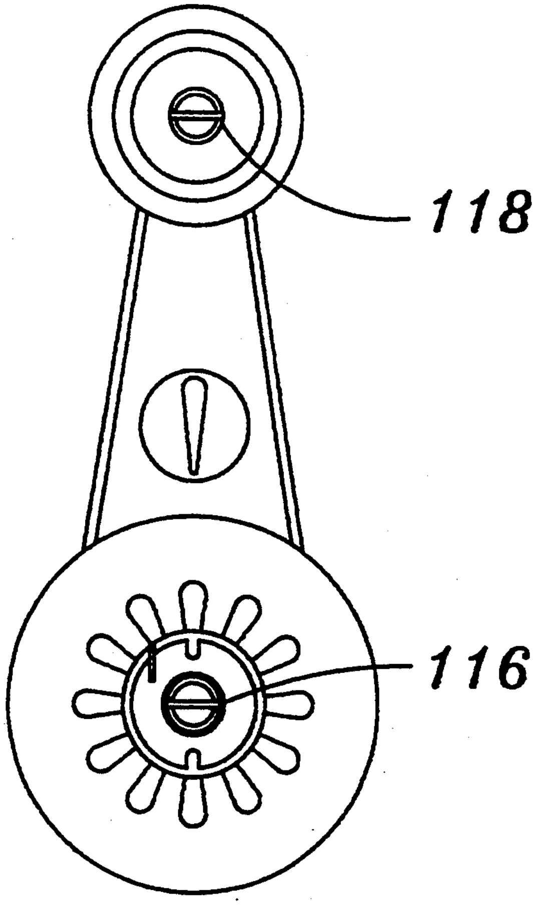
FIG. 3 is a top plan view of the applicator.

The pins 30 include slots 118 arid 116 as best illustrated in FIG. 3 and are adapted to receive a flathead screwdriver.

Moreover, FIG. 4 further illustrates the slot 104 for the wiper positioning tang, bottom of the tray 106 and the countersunk clearance hole 110. The sidewalls shown in FIG. 4 define a glue and water excess retaining cavity 112. Furthermore, numeral 26 illustrates a threaded and counter-bored hole.

Figure 8:
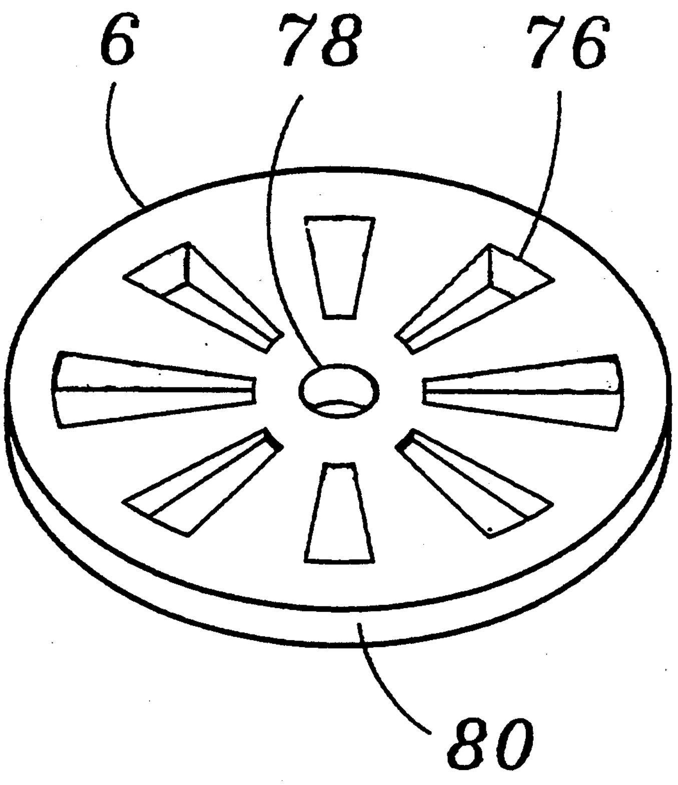
FIG. 8 is a perspective view of the disc.

The guide disc shown in FIG. 8 includes drain slots for glue and water 76 as well as a guide disc bearing hole 78. Moreover the guide disc 6 includes guide disc edge 80 which is rounded and adapted to contact a surface of a wall or the like.

Figure 9:
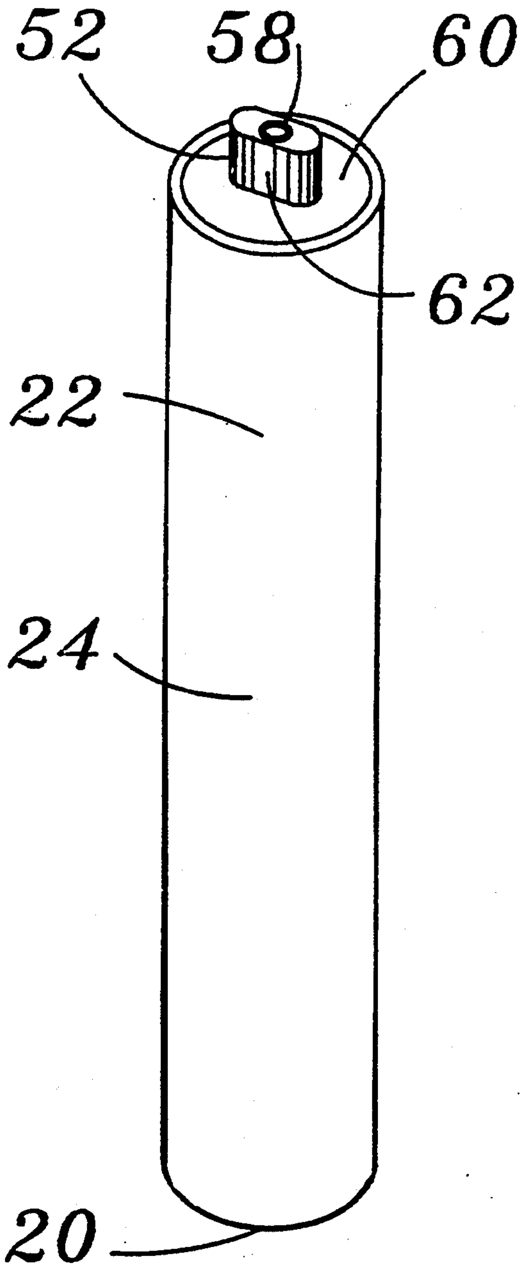
FIG. 9 is a perspective view of the roller.
Figure 10:
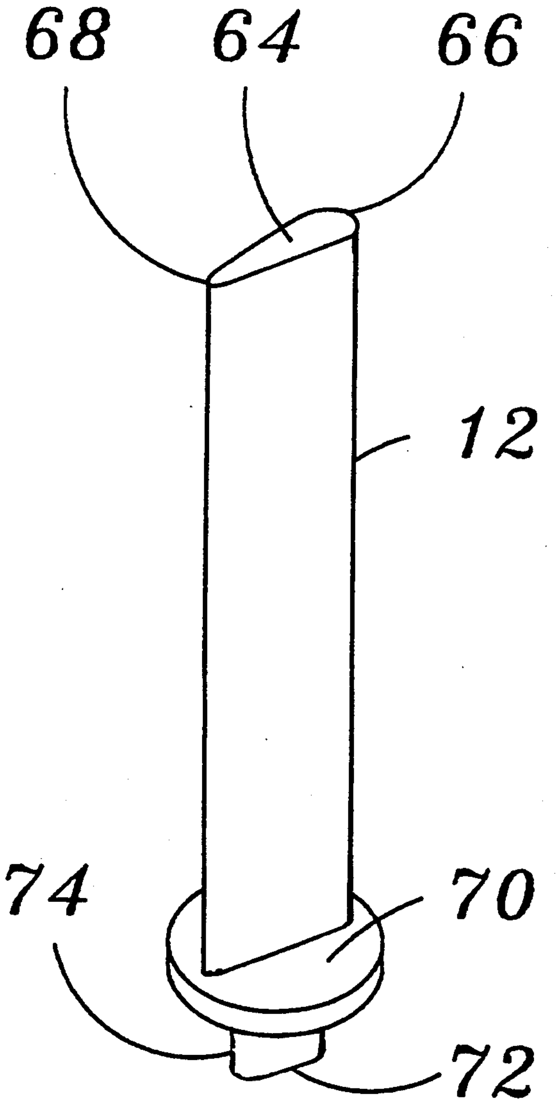
FIG. 10 is a perspective view of the wiper blade.

FIG. 9 more fully particularizes the handle which includes a threaded hole 58 for mounting to the tray, a mounting surface 60, positioning tang 62 and a foam handle sleeve 24 with the thread 20 adapted for extensions.

The use of the invention shall now be described. A roll of wallpaper border is rolled around the spool 6 by use of the spool crank handle 10. During the rolling operation an end of the wallpaper border may be inserted into the slots referred to earlier. The loose end of the roll of wallpaper border (not shown) is then pulled by the user so as to contact the roller 16. Thereafter the user may pull or roll the applicator in the direction so as to pull or unwind the roll of paper from the spool so as to contact the wiper blade which wipes excess water and paste from the paper as the wallpaper border travels pass the wiper blade as the roller contacts and applies the pre-pasted wallpaper border to a wall surface. Any excess water or paste will then drip down from the blade into the cavity 112 of the tray.

Although the preferred embodiment as well as the operation and use have been specifically described, it should be understood that variations in the preferred embodiment could be achieved by a person skilled in the art without departing from the spirit of the invention.

The embodiments of the invention in which an exclusive property or privilege is claimed are defined as follows:

1. Apparatus for applying wet pasted paper horizontally to a surface comprising:
- (a) a tray;
- (b) a rotatable spool disposed at one end of said tray at a perpendicular angle relative said tray, said spool adapted to receive a roll of said paper;
- (c) a roller disposed at another end of said tray at a perpendicular angle relative said tray for applying said paper to said wall as said paper is unrolled from said spool;
- (d) blade means disposed between said spool and said roller at a perpendicular angle relative said tray for wiping said paper;
- (e) a guide disc concentric with said rotatable spool, said guide disc adapted to rotatably contact said wall so as to maintain proper spacing of said rolled paper from said wall when said paper is unrolled from said spool, said guide disc:
  - (i) extends beyond said tray; and
  - (ii) includes apertures for permitting passage of excess wet paste from said wet pasted paper rolled about said spool into said tray.

2. Apparatus as claimed in claim 1 wherein said spool is slotted so as to receive a portion of said paper.

3. Apparatus as claimed in claim 2 wherein said spool includes a crank handle in the region remote from said tray for rotating said spool so as to roll said paper around said spool.

4. Apparatus as claimed in claim 3 wherein said spool includes a sleeve adapted to frictionally engage said spool so as to accommodate widths of said paper roll around said spool.

5. Apparatus as claimed in claim 4 wherein said blade has a wedge-shaped cross section.

6. Apparatus as claimed in claim 5 wherein said roller has a foam surface.

7. Apparatus as claimed in claim 6 wherein said tray includes sidewalls for capturing excess water and paste wiped from said wallpaper by said blade.

8. Apparatus as claimed in claim 7 wherein said tray includes a handle.

9. An applicator for applying wetted, pasted wallpaper border to a wall comprising:
- (a) a tray having parametral side walls;
- (b) a handle connected to said tray at a perpendicular angle;
- (c) a spool having an axis of rotation perpendicular to said tray and disposed at one end of said tray within said sidewalls wherein said spool is adapted to receive and dispense a roll of said wallpaper border;
- (d) a roller having an axis of rotation perpendicular to said tray and disposed at another end of said tray within said sidewalls for applying said wallpaper border to said wall;
- (e) a wiper blade disposed at a perpendicular angle to said tray between said spool and said roller for wiping excess paste and water from said border
- (f) a sleeve adapted to frictionally engage said spool so as to accommodate different widths of said wallpaper, said sleeve including a base to support said paper where said base extends beyond said tray and includes drain slots for permitting the passage of excess wet paste from said wetted pasted wallpaper rolled about said spool into said tray.

10. An applicator as claimed in claim 9 wherein said spool includes a guide disc adapted to rotatably contact said wall so as to maintain proper spacing of said roll of wallpaper from said wall when said paper is unrolled from said spool, said guide disc:
- (a) extending beyond said tray;
- (b) including apertures for permitting passage of excess wet paste from said wet pasted paper rolled about said spool into said tray.

11. An applicator as claimed in claim 10 wherein said sleeve includes a slot for an O-ring adapted to frictionally engage said spool.

12. An applicator as claimed in claim 11 wherein said spool includes a spool crank for rolling said border around said spool.

13. An applicator as claimed in claim 12 wherein said spool is hollow and includes securing means for rotatably securing said spool to said tray.

14. An applicator as claimed in claim 13 wherein said securing means includes a bolt.

15. An applicator as claimed in claim 14 wherein said handle includes a threaded end for attachment to another handle.

16. A method of applying wetted pasted wallpaper border of a certain width horizontally at the top of a wall adjacent a ceiling with apparatus having a tray, a spool having a rotatable end connected to one end of said tray and a free rotatable end, a roller disposed at another end of said tray, a blade disposed between said spool and said roller, and a sleeve adapted to slidingly frictionally engage said spool, said method comprising the steps of:

(a) sliding said sleeve along said spool to accommodate said width of said wallpaper along said spool;

(b) rolling said wetted wallpaper about said spool whereby one end of said roll of wallpaper contacts said sleeve and another end of said rolled wallpaper is adjacent said free end of said spool so as to permit application of said border horizontally at the top of said wall adjacent said ceiling;

(c) pulling said wallpaper from said roll against said blade and said roller;

(d) applying said pulled wallpaper against the top of said wall adjacent said ceiling;

(e) moving said apparatus in a direction so as to unwind said wallpaper from said spool so as to pull said wallpaper against said blade to wipe excess water and paste into said tray, and against said roller to apply said wallpaper horizontally at the top of said wall adjacent said ceiling.

17. A method as claimed in claim 16 wherein said sleeve includes drain slots for permitting passage of excess water and paste from said roll of wallpaper into said tray.

18. Apparatus for applying wet pasted paper horizontally to a surface comprising:

(a) a tray;

(b) a rotatable spool having an axis of rotation, said spool disposed at one end of said tray at a perpendicular angle relative said tray, said spool adapted to receive a roll of said paper;

(c) a roller having an axis of rotation, said roller disposed at another end of said tray at a perpendicular angle relative said tray for applying said paper to said wall as said paper is unrolled from said spool;

(d) blade means disposed between said spool and said roller at a perpendicular angle relative said tray for wiping said paper;

(e) said blade, said axis of rotation of said spool and said axis of rotation of said blade are disposed along a common plane.

19. Apparatus for applying wet pasted paper horizontally to a surface comprising:

(a) a tray;

(b) a rotatable spool disposed at a perpendicular angle relative said tray, said spool adapted to receive a roll of said paper;

(c) a guide disc concentric with said rotatable spool, said guide disc adapted to rotatably contact said wall so as to maintain proper spacing of said rolled paper from said wall when said paper is unrolled from said spool, said guide disc:

(i) extends beyond said tray; and (ii) includes apertures for permitting passage of excess wet paste from said wet pasted paper rolled about said spool into said tray.

* * * * *